(12) United States Patent
Torres

(10) Patent No.: US 9,489,507 B2
(45) Date of Patent: Nov. 8, 2016

(54) SECURE PERSONAL STORAGE DEVICE

(71) Applicant: Duly Corporation, White Plains, NY (US)

(72) Inventor: Jose A. Torres, Chappaqua, NY (US)

(73) Assignee: DULY CORPORATION, White Plains, NJ (US)

( * ) Notice: Subject to any disclaimer, the term of this patent is extended or adjusted under 35 U.S.C. 154(b) by 33 days.

(21) Appl. No.: 14/475,065

(22) Filed: Sep. 2, 2014

(65) Prior Publication Data

US 2016/0063237 A1    Mar. 3, 2016

(51) Int. Cl.
| | |
|---|---|
| *G06F 7/14* | (2006.01) |
| *G06F 21/44* | (2013.01) |
| *G06F 21/57* | (2013.01) |
| *G06F 21/78* | (2013.01) |

(52) U.S. Cl.
CPC ............... *G06F 21/44* (2013.01); *G06F 21/57* (2013.01); *G06F 21/78* (2013.01); *G06F 2221/2149* (2013.01)

(58) Field of Classification Search
None
See application file for complete search history.

(56) References Cited

U.S. PATENT DOCUMENTS

| | | | | |
|---|---|---|---|---|
| 5,960,084 A | * | 9/1999 | Angelo | G06F 21/34 235/380 |
| 2002/0099974 A1 | * | 7/2002 | Lin | G06F 11/1417 714/13 |
| 2007/0094439 A1 | * | 4/2007 | Kumar | G06F 9/4401 711/103 |
| 2008/0022393 A1 | * | 1/2008 | Waltermann | G06F 21/31 726/18 |
| 2009/0106480 A1 | * | 4/2009 | Chung | G06F 12/0866 711/100 |

* cited by examiner

*Primary Examiner* — Fatoumata Traore
(74) *Attorney, Agent, or Firm* — Tutunjian & Bitetto, P.C.; Edward P. Ryan

(57) ABSTRACT

A storage device includes a memory and two physical interfaces. The first physical interface is configured to provide read-only memory access to a connected device. The second physical interface is configured to provide read/write memory access to a connected device.

17 Claims, 3 Drawing Sheets

SECURE PERSONAL STORAGE DEVICE

BACKGROUND

Technical Field

The present invention relates to personal storage devices and, more particularly to secure personal storage devices that offer read-only and read-write functionality.

Description of the Related Art

Personal storage devices have become commonplace, allowing users to carry large amounts of data with them on devices as small as their thumbnail. These devices typically use a common interface, such as universal serial bus (USB) that allow the users to access their device from any computer.

However, the ubiquity of these devices has provoked attacks against them. When the device is accessed from an untrusted computer, that computer has the ability to write malicious data to the device. As a result, these devices become a common vector for the spread of viruses and other malicious software, completely bypassing internet-facing channels by employing individual users to physically bring the malicious software past a network's firewalls.

Additionally, even attempts to secure the device—e.g., through encryption—can be circumvented by direct access to the hardware. Existing devices have difficulty protecting against such attacks, as an attacker with physical access and the right tools can simply access the device's decryption functions directly.

SUMMARY

An embodiment of a storage device includes a memory and two physical interfaces. The first physical interface is configured to provide read-only memory access to a connected device. The second physical interface is configured to provide read/write memory access to a connected device.

An embodiment of a storage device includes a first memory and two physical interfaces. The first physical interface configured to provide read-only memory access to a connected device. The second physical interface configured to provide read/write memory access to a connected device. A transceiver communicates information between the memory and the transceivers. A logic performs an encryption/decryption function on the information communicated between the memory and the transceivers. A power management unit configured to control power to the memory and to detect when power is provided to the memory by an unauthorized source.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Embodiments of the present invention provide a secure personal storage device that is resistant to physical tampering and that provides read-only access when users are accessing the device from untrusted machines. To accomplish the latter function, the device is provided with two distinct access interfaces, one of which provides standard read-write access, while the other provides read-only access. Additionally, flexible memory management allows the device to turn off power to the memory, frustrating sniffer attempts or, at least, making them detectable.

Figure 1:
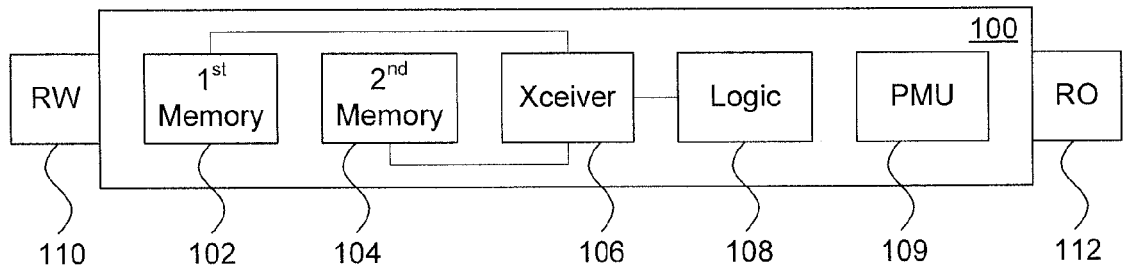
FIG. 1 is a block diagram of a secure personal storage device in accordance with the present principles.

Referring now to the drawings in which like numerals represent the same or similar elements and initially to FIG. 1, an exemplary personal storage device (PSD) 100 is shown. The PSD 100 includes two distinct memories 102 and 104. These memories may use any appropriate type of non-volatile storage technology, but it is specifically contemplated that they will employ some variety of rewritable flash memory. The two memories 102 and 104 communicate with a transceiver 106 which controls how data is read from and written to the memories. It should be understood that the memories 102 and 104 may be fixed to the PSD 100, or may be removable memories such as, e.g., micro-SD cards.

Logic 108 controls the transceiver 106 and may include a processor and control information that governs how the memories 102 and 104 are organized and accessed. In particular, the logic 108 may provide cryptographic functions that securely store and retrieve data on the memories. In addition, the logic 108 may put the memories 102 and 104 into, e.g., concatenated or redundant formats. In a concatenated format, the capacities of the two memories are combined. In a redundant format, such as RAID 0, the two memories are mirrored, securing the contents in the case of a physical failure of one of the memories.

A power management unit (PMU) 109 has the ability to selectively provide power to the memories 102 and 104, turning them off when not in use. Furthermore, the PMU has the ability to detect when power is provided to device components without authorization. For example, an unauthorized user with physical access to the device may attempt to provide power to the memories 102 and 104 and the logic 108 in an attempt to read information. The PMU may then signal the transceiver 106 to "cut" the connections between the memories 102/104 and the logic 106, such that the encryption functions of the logic 106 cannot be used to decrypt the stored information. It should be noted that this may be accomplished in multiple ways. In one case, the change may be made reversibly, while in another the change may be made irreversible through the use of, e.g., electrically programmable fuses.

The PMU 109 may further include components to provide protection against electrostatic discharge (ESD) and may also include a real-time supercapacitor. The use of a real-time supercapacitor allows the PMU 109 to continue providing power to the logic 108 and the transceiver 106 long enough to put the memories 102 and 104 into a safe state before loss of power. This protects against corruption of data in the case of accidental premature removal of the PSD 100 from a machine.

Although it is contemplated that the above components may be implemented as separate chips, one embodiment consolidates the chips into a single application-specific integrated chip (ASIC). This consolidation increases the difficulty of physical attacks on the hardware, as all of the relevant connections between the components will be on a single die. In such an embodiment, the attacker would need a clean room and specialized tools to access the hardware without destroying it in the process.

The PSD 100 includes two distinct interfaces 110 and 112 that provide access to the memories 102 and 104. The first interface 110 is a read/write interface, allowing full access to the memories 102 and 104. The second interface 112 is a read-only interface. When the second interface 112 is connected to a machine for reading, the logic 108 will only provide read access to the memories, protecting the PSD 100 from unauthorized writes and thereby preventing the PSD 100 from becoming infected by any malicious software running on that machine. It is specifically contemplated that the interfaces 110 and 112 will be universal serial bus (USB) interfaces, but it should be understood that the present principles may be applied to any suitable interface.

An additional function of the PSD 100 is to protect other devices from unauthorized access while charging. The PMU 109 can provide a power passthrough function when the PSD 100 is connected to an outlet. When both interfaces 110 and 112 are connected to devices, one of which provides power, the PSD 100 can route that power through to the charging device without passing through any data. This protects against unauthorized access of the charging device when plugging the device into an untrusted outlet.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 2:
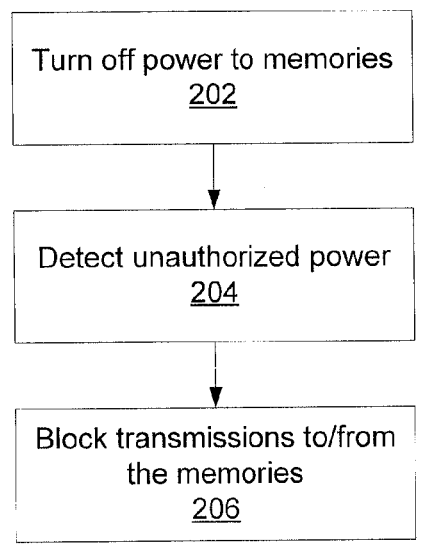
FIG. 2 is a block/flow diagram of a method for power management in a secure personal storage device in accordance with the present principles.

Referring now to FIG. 2, a method for stopping a physical circumvention attack is shown. Block 202 turns off power to memories 102 and 104, e.g., when the memories are not being used. Block 204 detects unauthorized power being provided to the memories 102 and 104 or logic 108, which indicates that an attacker is attempting to circumvent the protections in place when accessing the memories through the interfaces 110 and 112. This detection may be performed by PMU 109 in response to the detection of power in the circuit that is not being provided through one of the interfaces.

After determining that unauthorized access is in progress, block 206 blocks communications to and from the memories 102 and 104. This may be accomplished by instructing the transceiver 106 to block transmissions to and from the memories. This may alternatively be accomplished by causing physical damage to the PSD 100 and/or the memories to prevent subsequent attempts to access them.

Figure 3:
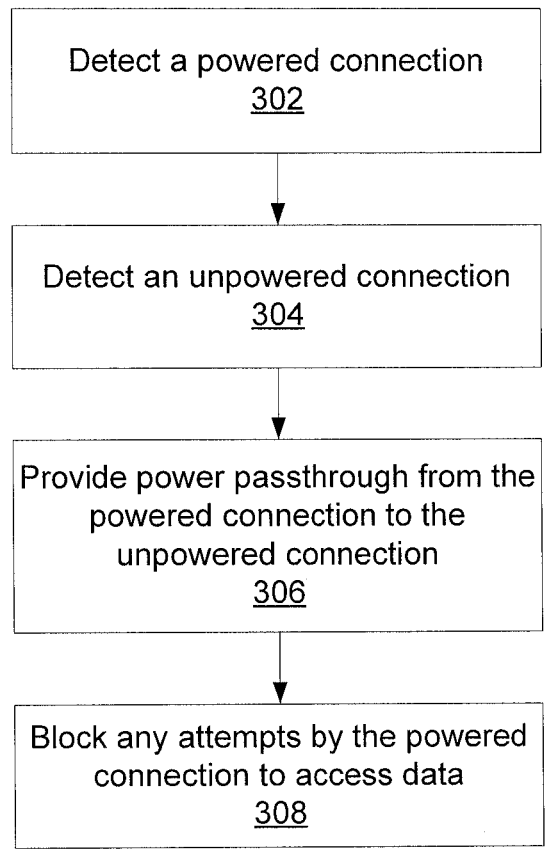
FIG. 3 is a block/flow diagram of providing secure power passthrough in a secure personal storage device in accordance with the present principles.

Referring now to FIG. 3, a method for providing power passthrough is shown. Block 302 detects the presence of a powered connection on a first interface. Block 304 detects the presence of an unpowered connection on a second interface. When these conditions are met, block 306 provides power passthrough from the powered connection to the unpowered connection, such that the unpowered device can charge without being exposed to the potentially malicious device on the powered connection. Block 306 may further determine whether the powered connection is from a charger or a computer's data port (e.g., a USB port). This may be accomplished by detecting fluctuations in a voltage and current output by the powered connection. If the powered connection provides a current of about 0.5A, and if that current fluctuates (indicating that the power source is a computer's data port) then block 306 may also signal the logic 108 to provide access to the memories 102 and 104.

Optionally, block 308 blocks attempts to access data by the powered connection. This may be accomplished by using the read-only interface 112 to connect to the powered device or, alternatively, may be implemented in logic 108 when connections on both interfaces are present.

The present embodiments make use of on-board cryptography to protect not only stored data from unauthorized access, but the device's firmware as well. For example, the device's firmware may be encrypted using RSA encryption with an SHA-256 cryptographic hash for data verification via on-board cryptography functions to ensure that the device only boots up in an authorized manner. An initial firmware may be loaded that, for example, provides a unique serial number of, e.g., 72 bits, to verify against a hash stored in a secondary firmware. Once verified, a unique key is read from a one-time programmable section and is hashed and verified against a hash stored in the firmware. At this point, the secondary firmware may be decrypted and executed to provide access to the device.

The startup procedure uses delay timers that ensure that there is a correct power-on sequence. The power-on sequence check ensures that the main CPU is operating on-board, as opposed to being removed from the circuit board and running under test by a security researcher attempting to access the device. In such an embodiment, the logic 108 of the PSD will not operate if the PMU 109 indicates that power-on signals are received-out of order.

Figure 4:
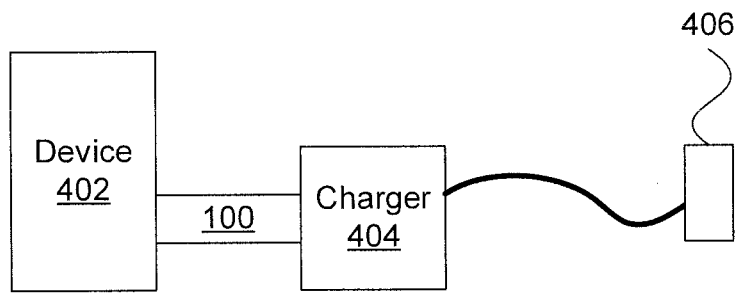
FIG. 4 is a diagram illustrating the use of a secure personal storage device in accordance with the present principles to defeat an attack vector.

Referring now to FIG. 4, an exemplary use of the present embodiments is shown. The present embodiments may be used to protect against several different threat vectors. As noted above, a device charger 404 can operate as a vector for loading malicious software onto a device 402 (e.g., a cellular phone or tablet). What appears to be a simple charger 404, connected to, e.g., a wall outlet 406, may conceal circuitry that accesses the device and transfers protected information or infects the device with a virus or other malicious software. A PSD 100 can be used to isolate the device charger 404 from the device 402, functioning as a power passthrough without allowing the charger access to the device's logic.

Figure 5:
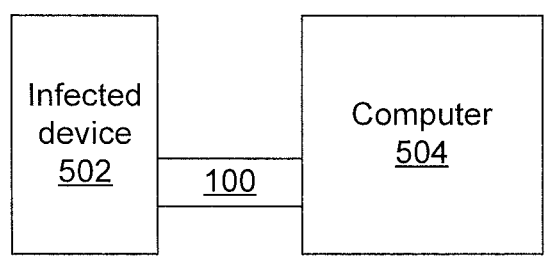
FIG. 5 is a diagram illustrating the use of a secure personal storage device in accordance with the present principles.

Referring now to FIG. 5, an additional example of the use of the present embodiments against a threat vector is shown. This threat vector is against computers, as an infected mobile device 502 can be used to load malicious software onto a computer 504. However, the PSD 100 may be used as an intermediary storage device without being infected by the mobile device 502, such that a user can transfer files first to the PSD 100 and subsequently to the mobile device 502 or the reverse.

Having described preferred embodiments of a secure personal storage device (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A storage device, comprising:
    a first memory;
    a first physical interface configured to provide read-only memory access to a connected device;
    a second physical interface configured to provide read/write memory access to a connected device;
    a first firmware that stores a serial number;
    a second firmware that stores a hash of the serial number and encrypted boot instructions; and
    a one-time programmable section of memory that stores a unique key that decrypts the encrypted boot instructions.

2. The storage device of claim 1, further comprising a second memory, wherein the first and second memories are removable.

3. The storage device of claim 2, wherein the first and second memories are configured to mirror data.

4. The storage device of claim 2, wherein the first and second memories are configured to concatenate their respective storage capacities.

5. The storage device of claim 1, further comprising:
    a transceiver configured to communicate information between the memory and the first and second physical interfaces; and
    a logic configured to perform an encryption/decryption function on the information communicated between the memory and the first and second physical interfaces.

6. The storage device of claim 5, further comprising a power management unit configured to control power to the memory and to detect when power is provided to the memory by an unauthorized source.

7. The storage device of claim 6, wherein the transceiver is configured to block communications between the memory and the interfaces when the power management unit detects power by an unauthorized source.

8. The storage device of claim 5, wherein the transceiver is configured to pass information from the memory to the read-only interface and to block information from the read-only interface to the memory.

9. The storage device of claim 1, further comprising delay timers to designate a predetermined power-on sequence.

10. The storage device of claim 9, wherein the storage device will not power on if power-on signals are not received in an order specified by the predetermined power-on sequence.

11. A storage device, comprising:
    a first memory;
    a first physical interface configured to provide read-only memory access to a connected device;
    a second physical interface configured to provide read/write memory access to a connected device;
    a transceiver configured to communicate information between the memory and the first and second physical interfaces;
    a logic configured to perform an encryption/decryption function on the information communicated between the memory and the first and second physical interfaces;
    a power management unit configured to control power to the memory and to detect when power is provided to the memory by an unauthorized source;
    a first firmware that stores a serial number;
    a second firmware that stores a hash of the serial number and encrypted boot instructions; and
    a one-time programmable section of memory that stores a unique key that decrypts the encrypted boot instructions.

12. The storage device of claim 11, further comprising a second memory, wherein the first and second memories are removable.

13. The storage device of claim 12, wherein the first and second memories are configured to mirror data.

14. The storage device of claim 12, wherein the first and second memories are configured to concatenate their respective storage capacities.

15. The storage device of claim 11, wherein the transceiver is configured to block communications between the memory and the interfaces when the power management unit detects power by an unauthorized source.

16. The storage device of claim 11, wherein the transceiver is configured to pass information from the memory to the read-only interface and to block information from the read-only interface to the memory.

17. The storage device of claim 11, further comprising delay timers to designate a predetermined power-on sequence, wherein the storage device will not power on if power-on signals are not received in an order specified by the predetermined power-on sequence.

* * * * *